US008314889B2

(12) United States Patent
Moon et al.

(10) Patent No.: US 8,314,889 B2
(45) Date of Patent: Nov. 20, 2012

(54) VIDEO PROCESSING APPARATUS AND VIDEO PROCESSING METHOD

(75) Inventors: Jung-hwa Moon, Suwon-si (KR); Jae-hwan Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1214 days.

(21) Appl. No.: 11/544,584

(22) Filed: Oct. 10, 2006

(65) Prior Publication Data

US 2007/0083889 A1 Apr. 12, 2007

(30) Foreign Application Priority Data

Oct. 11, 2005 (KR) .......................... 10-2005-009561

(51) Int. Cl.
*H04N 5/50* (2006.01)

(52) U.S. Cl. ............................ 348/569; 725/38; 725/49

(58) Field of Classification Search ................. 348/731, 348/732, 725, 569, 563–564, 570, 558, 469, 348/552, 553, 723, 21–24; 725/49, 59, 131; 345/204, 213; 710/63, 69, 70
See application file for complete search history.

(56) References Cited

U.S. PATENT DOCUMENTS

| | | | | |
|---|---|---|---|---|
| 4,958,367 | A * | 9/1990 | Freer et al. | 379/84 |
| 6,313,886 | B1 * | 11/2001 | Sugiyama | 348/731 |
| 6,817,027 | B1 * | 11/2004 | Curreri | 725/28 |
| 6,888,581 | B2 * | 5/2005 | Yamamoto et al. | 348/731 |
| 6,990,679 | B2 * | 1/2006 | Curreri | 725/56 |
| 6,992,728 | B2 * | 1/2006 | Takagi et al. | 348/569 |
| 7,024,676 | B1 * | 4/2006 | Klopfenstein | 725/49 |
| 7,030,933 | B2 * | 4/2006 | Takagi et al. | 348/569 |
| 7,050,117 | B2 * | 5/2006 | Takagi et al. | 348/725 |
| 7,206,031 | B2 * | 4/2007 | Yamamoto et al. | 348/731 |
| 7,215,382 | B2 * | 5/2007 | Bennett | 348/570 |
| 7,688,389 | B2 * | 3/2010 | Takagi et al. | 348/731 |
| 7,787,061 | B2 * | 8/2010 | Kurose et al. | 348/731 |
| 7,792,089 | B2 * | 9/2010 | Aiken et al. | 370/347 |
| 2002/0030764 | A1 * | 3/2002 | Kim et al. | 348/731 |

FOREIGN PATENT DOCUMENTS

| | | | |
|---|---|---|---|
| CN | 1143529 | C | 7/2002 |
| JP | 2002-112127 | A | 4/2002 |
| JP | 200-232796 | A | 8/2002 |
| JP | 2002-223396 | A | 8/2002 |
| JP | 2002-232794 | A | 8/2002 |
| JP | 2003-189199 | A | 7/2003 |
| KR | 20020029666 | | 4/2002 |
| KR | 10-2003-0029771 | A | 4/2003 |
| KR | 10-2003-0079548 | A | 10/2003 |
| KR | 1020050089631 | | 9/2005 |

* cited by examiner

*Primary Examiner* — Paulos Natnael
(74) *Attorney, Agent, or Firm* — Sughrue Mion, PLLC

(57) ABSTRACT

A video processing apparatus including a signal receiving part for receiving a video signal with a main channel and a sub channel; a video processing part for performing a video process for the received video signal; a display for displaying a video based on the processed video signal; and a controller for controlling the signal receiving part and the video processing part to display identification information of the main channel and the sub channel of the received video signal and selection of the main channel or the sub channel by a user, receive channel selection information of the selected main channel or sub channel from the user, and receive and process the video signal corresponding to the channel selection information.

16 Claims, 5 Drawing Sheets

START
S10 RECEIVE VIDEO SIGNAL
S11 DISPLAY CHANNEL NUMBER OF MAIN/SUB CHANNEL
S12 SWITCHING OF MAIN/SUB CHANNEL? YES → S13 SWITCH BETWEEN MAIN/SUB CHANNEL AND CHANGE SELECTIVE DISPLAY; NO
S14 CHANGE OF CHANNEL? YES → S15 INCREASE OR DECREASE CHANNEL NUMBER; NO
S16 DIRECT INPUT OF CHANNEL NUMBER? YES → S17 CHANGE CHANNEL WITH INPUT CHANNEL NUMBER; NO
RETURN 81 82 83 13 2 13 3 "1" INPUT 13 1
81 82 83 13 2 81 83 82 14 2
"15" INPUT 81 82 83 15 2

VIDEO PROCESSING APPARATUS AND VIDEO PROCESSING METHOD

CROSS-REFERENCE TO RELATED APPLICATIONS

This application claims the benefit under 35 U.S.C. §119 of Korean Patent Application No. 2005-0095615, filed on Oct. 11, 2005, the entire disclosure of which is hereby incorporated by reference.

BACKGROUND OF THE INVENTION

1. Field of the Invention

Apparatuses and methods consistent with the present invention relate to video processing, and more particularly, to video processing which is capable of selecting broadcasting channels quickly and conveniently.

2. Description of the Related Art

A video processing apparatus such as a TV receives video signals from terrestrial TV broadcasting, cable TV broadcasting and other broadcasts, performs a video processing for the received video signals, and displays video based on the processed video signal. When the video processing apparatus receives and processes the video signals, it is very difficult to select a channel desired by a user with ease where there exist several hundred channels in digital TV broadcasting, cable TV broadcasting, etc.

As an example of a conventional method for such channel selection, there is a method in which a user directly inputs a channel number to select a channel by pushing numeric keys provided in a remote controller. Although this method of directly inputting the channel number has an advantage of quick channel selection, it also has a disadvantage in that the desired channel may not be selected if the user does not know the channel number.

In addition, there is another method in which a user selects a channel, increasing or decreasing a channel number by selectively pushing one or two pairs of keys provided in a remote controller, which are disposed in vertical and/or horizontal symmetry. Although this method of selecting the channel with the increase or decrease of the channel number has an advantage in channel selection through channel navigation when the user does not know the channel number, it also has a disadvantage in user's inconvenience since the number of operations to select a channel increases as the number of channels increases.

SUMMARY OF THE INVENTION

To overcome the above problems, it is an aspect of the present invention to provide a video processing apparatus and a video processing method, which are capable of selecting a broadcasting channel quickly and conveniently.

The foregoing and/or other aspects of the present invention are achieved by providing a video processing apparatus comprising: a signal receiving part for receiving a video signal with a main channel and a sub channel; a video processing part for performing a video process for the received video signal; a display for displaying a video based on the processed video signal; and a controller for controlling the signal receiving part and the video processing part to display identification information of the main channel and the sub channel of the received video signal and selection of the main channel or the sub channel by a user, receive channel selection information of the selected main channel or sub channel from the user, and receive and process the video signal corresponding to the channel selection information.

According to an exemplary embodiment of the present invention, the identification information and the channel selection information of the main channel and the sub channel comprise information on channel numbers of the main channel or the sub channel, respectively.

According to an exemplary embodiment of the present invention, the video processing apparatus further comprises a user input part with a plurality of buttons corresponding to the channel numbers.

According to an exemplary embodiment of the present invention, the video processing apparatus further comprises a user input part with a pair of buttons corresponding to the main channel or the sub channel.

According to an exemplary embodiment of the present invention, the controller controls the signal receiving part to increase or decrease the channel numbers of the selected main channel or sub channel whenever a channel is changed by input from the user.

According to an exemplary embodiment of the present invention, the video processing apparatus further comprises a user input part with a pair of buttons each corresponding to the increase and decrease of the channel numbers.

The foregoing and/or other aspects of the present invention are achieved by providing a video processing method comprising: receiving a video signal with a main channel and a sub channel; displaying identification information of the main channel and the sub channel of the received video signal and selection of the main channel or the sub channel by a user; receiving channel selection information of the selected main channel or sub channel from the user; and receiving and processing the video signal corresponding to the channel selection information.

According to an exemplary embodiment of the present invention, the identification information and the channel selection information of the main channel and the sub channel comprise information on channel numbers of the main channel or the sub channel, respectively.

According to an exemplary embodiment of the present invention, the video processing method further comprises increasing or decreasing the channel numbers of the selected main channel or sub channel whenever a channel is changed by input from the user.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings.

Figure 1:
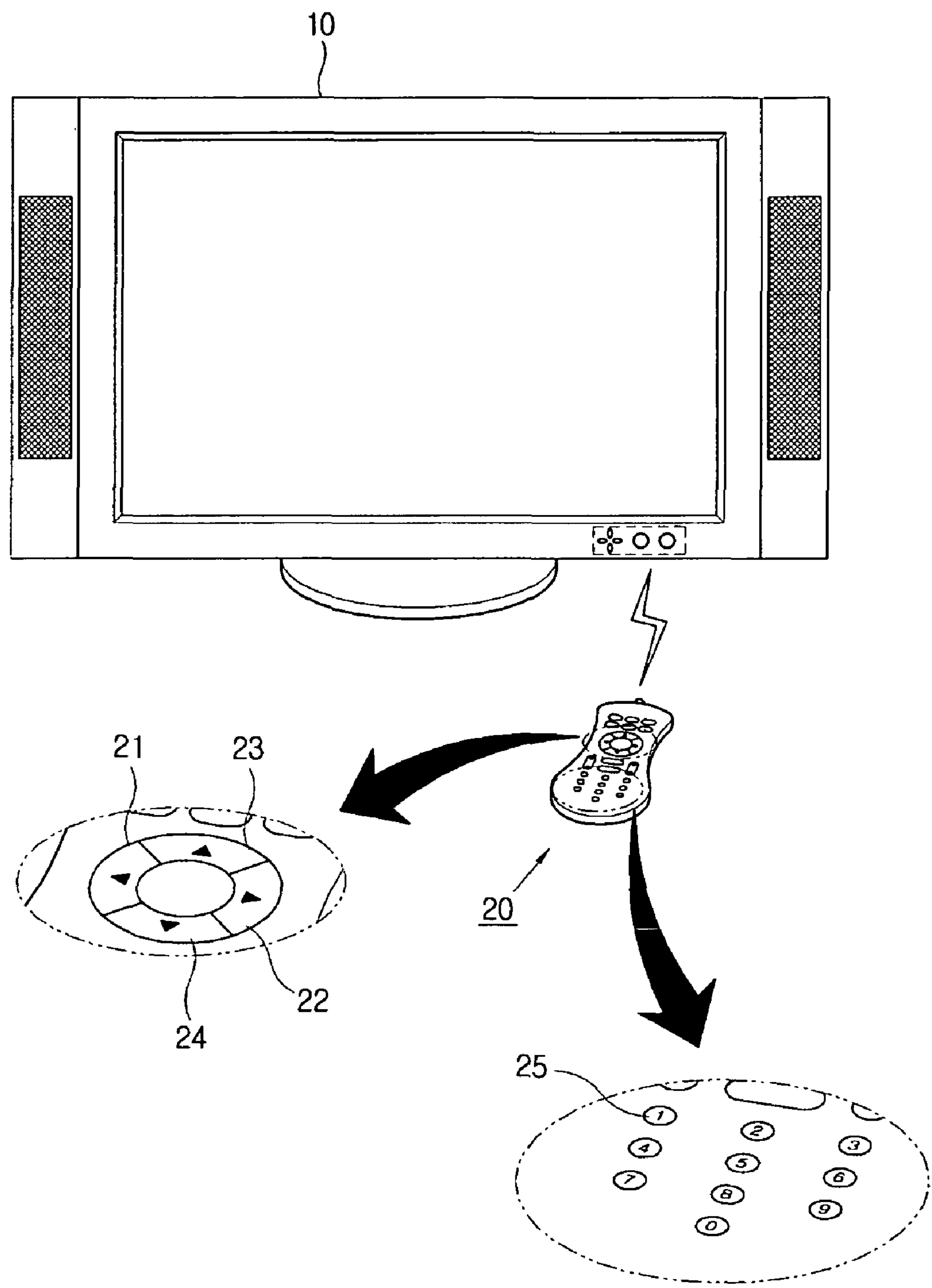
FIG. 1 is a view illustrating a video processing apparatus according to an exemplary embodiment of the present invention.

FIG. 1 is a view illustrating a video processing apparatus 10 according to an exemplary embodiment of the present invention.

As illustrated in FIG. 1, the video processing apparatus 10 receives video signals containing video information from broadcasting stations, performs a video process on the received video signals, and displays a video based on the video information of the processed video signals. The video processing apparatus 10 in this exemplary embodiment may be a digital TV for receiving, processing and displaying video signals with main channels and sub channels. In this case, the video signals received and processed by the video processing apparatus 10 are digital TV broadcasting signals.

The video processing apparatus 10 selects a main channel or a sub channel according to an operation of a user. The video processing apparatus 10 displays a current channel number of the main channel and a current channel number of the sub channel on a screen and allows a user to input a channel number of the main channel or the sub channel that the user desires to select. In this exemplary embodiment, the channel number of the main channel or the sub channel to be displayed on the screen is one example of identification information of the main channel or the sub channel of the present invention. Also, the channel number of the main channel or the sub channel inputted from the user is one example of channel selection information of the main channel or the sub channel of the present invention.

The video processing apparatus 10 may include a user input part 20 that receives information required for channel selection from the user, as shown in FIG. 1. In this exemplary embodiment, the user input part 20 may be implemented by a remote controller. Alternatively, the user input part 20 may be implemented by an input panel (not shown) with a plurality of input buttons, which is provided in a main body of the video processing apparatus 10 and receives information required for channel selection from the user.

Figure 2:
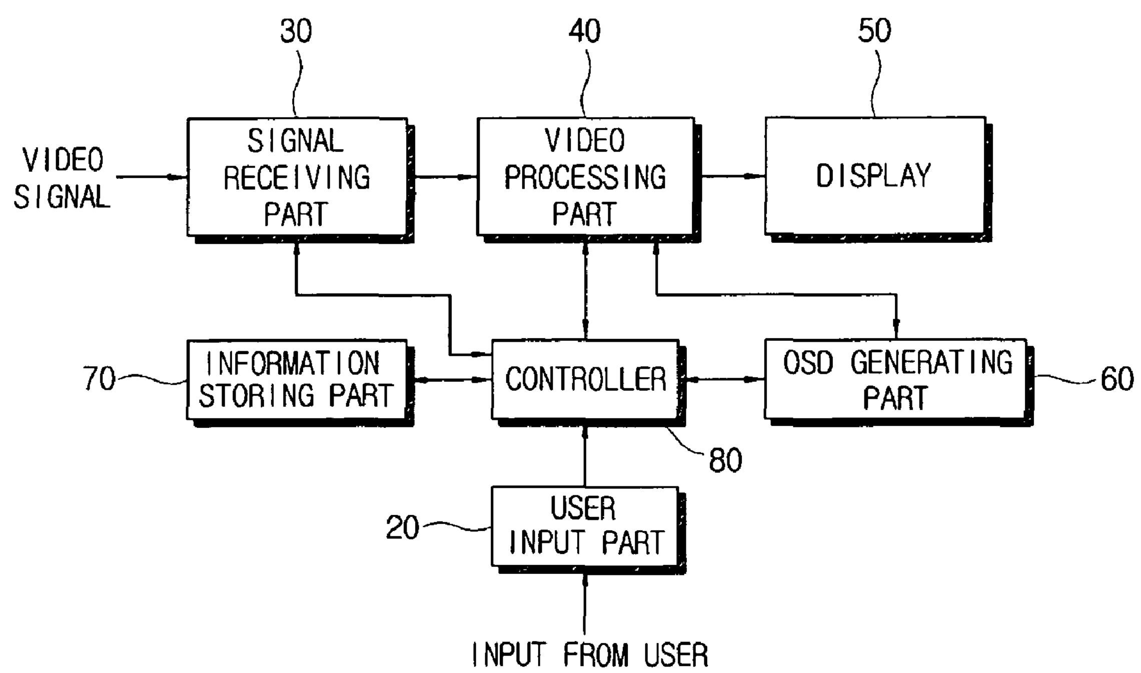
FIG. 2 is a schematic block diagram illustrating an internal configuration of the video processing apparatus according to an exemplary embodiment of the present invention.

FIG. 2 is a schematic block diagram illustrating an internal configuration of the video processing apparatus according to this exemplary embodiment. As shown in FIG. 2, the video processing apparatus 10 includes a signal receiving part 30, a video processing part 40, a display 50, an OSD (On Screen Display) generating part 60, an information storing part 70 and a controller 80, in addition to the user input part 20.

The signal receiving part 30 receives a video signal of a channel that a user desires to select. Specifically, the signal receiving part 30 receives a video signal tuned at a frequency corresponding to the channel selected by the user under control of the controller 80.

The video processing part 40 performs a video process for the video signal received in the signal receiving part 30 and transmits the video signal to the display 50. Specifically, the video processing part 40 performs a series of operations such as a decoding operation for extracting a video signal of a format adapted for display from the received video signal, an image enhancement operation for enhancing image quality of the extracted video signal, a scaling operation for adjusting resolution of a video in order to display the video of a proper size, etc., and may additionally perform a deinterlacing operation for an interlaced video signal.

The display 50 receives the processed video signal from the video processing part 40 and displays a video on a screen based on the received video signal. The display 50 may be implemented by a CRT (Cathode Ray Tube), an LCD (Liquid Crystal Display), a PDP (Plasma Display Panel), etc.

The OSD generating part 60 generates OSD information such as channel numbers of a main channel and a sub channel to be displayed on the display 50, indication of selection of the main channel or the sub channel, etc., under control of the controller 80.

The information storing part 70 stores information on channels of digital TV broadcasting, such as a so-called channel map.

The controller 80 controls the overall operation of the video processing apparatus 10. Specifically, the controller 80 controls operation of the signal receiving part 30, the video processing part 40, the OSD generating part 60, etc., according to user's instructions inputted from the user input part 20. Upon receiving information required for channel selection from the user input part 20, the controller 80 instructs the signal receiving part 30 to tune a selected channel with reference to the information storing part 70 and controls the video processing part 40 to perform the video process for the received video signal.

Figure 3:
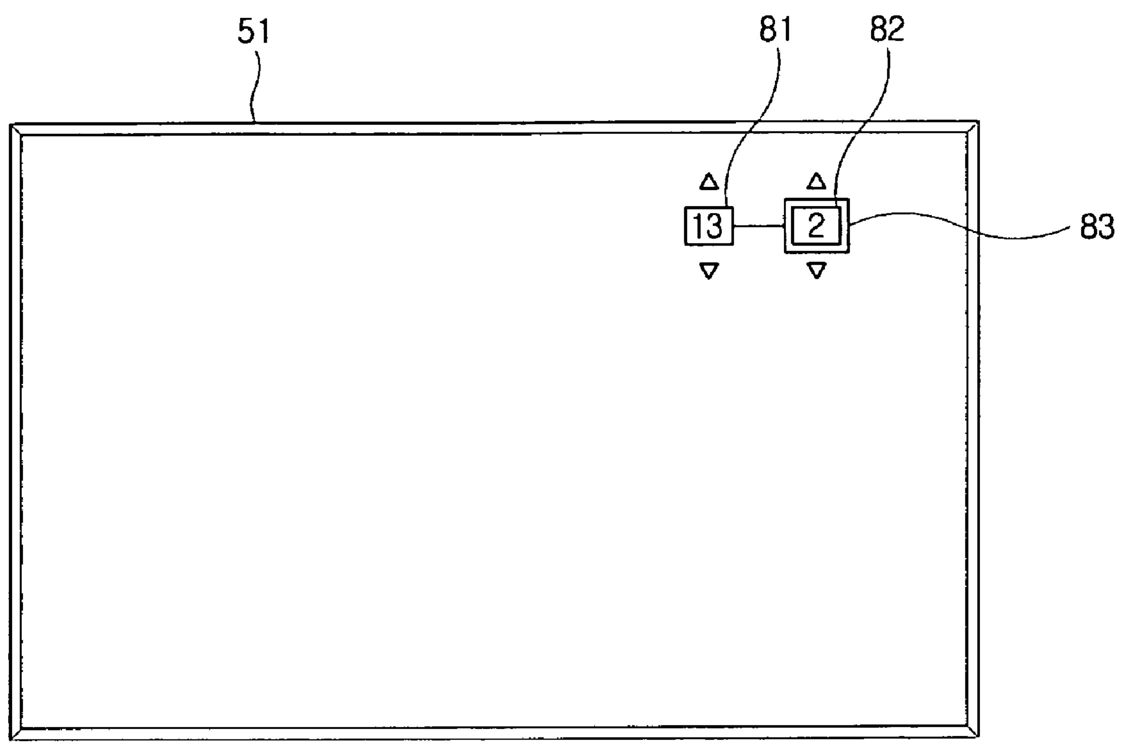
FIG. 3 is a view illustrating a screen on which channel numbers of a main channel and a sub channel are displayed, according to an exemplary embodiment of the present invention.

The controller 80 controls the OSD generating part 60 and the video processing part 70 such that the user may see channel numbers of the main channel and the sub channel of the received video signal. FIG. 3 is a view illustrating a screen on which channel numbers of the main channel and the sub channel are displayed. As shown in FIG. 3, the controller 80 displays a channel number 81 of the main channel and a channel number 82 of the sub channel on the screen 51 of the display 50. It is preferable, but not necessary, that the controller 80 displays the channel number 81 of the main channel and the channel number 82 of the sub channel in an upper right portion of the screen 51 of the display 50.

In addition, the controller 80 controls the OSD generating part 60 and the video processing part 70 such that selection of the main channel or the sub channel is indicated on the screen 51. As shown in FIG. 3, if the sub channel is selected, the controller 80 displays an image 83 highlighting the channel number 82 of the sub channel. At this time, if an instruction to change the sub channel to the main channel is inputted from the user through the user input part 20, the controller 80 changes the image 83 highlighting the channel number 82 of the sub channel to an image highlighting the channel number 81 of the main channel, thereby allowing the user to confirm which of the main channel and the sub channel is selected. As another example, if the main channel is selected, the controller 80 may change then image highlighting the channel number 81 of the main channel to the image highlighting the channel number 82 of the sub channel.

In this case, the user input part 20 may include a pair of buttons 21 and 22 disposed in a horizontal symmetry, as shown in FIG. 1, to transmit the information indicating that the main channel is selected when the left button 21 is pushed and the information indicating that the sub channel is selected when the right button 22 is pushed to the controller 80 (FIG. 1).

In addition, the user input part 20 may further include numeric buttons 25 labeled "0" to "9", respectively, as shown in FIG. 1, to transmit numeric information corresponding to a channel number, to the controller 80 when the numeric buttons 25 are pushed.

As shown in FIG. 3, if the sub channel is selected, that is, if the image 83 highlighting the channel number 82 of the sub channel is displayed, when the user inputs numeric information through the user input part 20 by pushing the numeric buttons 25, the controller 80 controls the signal receiving part 30 and the video processing part 40 to receive and process a video signal with a number indicated by the input numeric information as the channel number of the sub channel. On the other hand, if the main channel is selected, that is, if the image highlighting the channel number 81 of the main channel is displayed, when the user inputs numeric information through the user input part 20 by pushing the numeric buttons 25, the controller 80 controls the signal receiving part 30 and the video processing part 40 to receive and process a video signal with a number indicated by the input numeric information as the channel number of the main channel.

In addition, the user input part 20 may further include a pair of buttons 23 and 24 disposed in a vertical symmetry, as shown in FIG. 1, which transmit the information indicating that the channel number is to increase when the top button 23 is pushed and the information indicating that the channel number is to decrease when the bottom button 24 is pushed, to the controller 80.

As shown in FIG. 3, if the sub channel is selected, that is, if the image 83 highlighting the channel number 82 of the sub channel is displayed, when the user inputs the information indicating the increase of the channel number through the user input part 20 by pushing the top button 23, the controller 80 controls the signal receiving part 30 and the video processing part 40 to receive and process a video signal of the channel number of the sub channel incremented by one, of channel numbers of channels that are currently receiving video signals, with reference to the information storing part 70. On the other hand, if the main channel is selected, that is, if the image highlighting the channel number 81 of the main channel is displayed, when the user inputs the information indicating the increase of the channel number through the user input part 20 by pushing the top button 23, the controller 80 controls the signal receiving part 30 and the video processing part 40 to receive and process a video signal of the channel number of the main channel incremented by one, of channel numbers of channels that are currently receiving video signals, with reference to the information storing part 70.

On the other hand, when the user pushes the bottom button 24 through the user input part 20, the controller 80 controls the signal receiving part 30 and the video processing part 40 to receive and process a video signal of the channel number of the main channel or the sub channel decremented by one, of channel numbers of channels that are currently receiving video signals, with reference to the information storing part 70.

Figure 4:
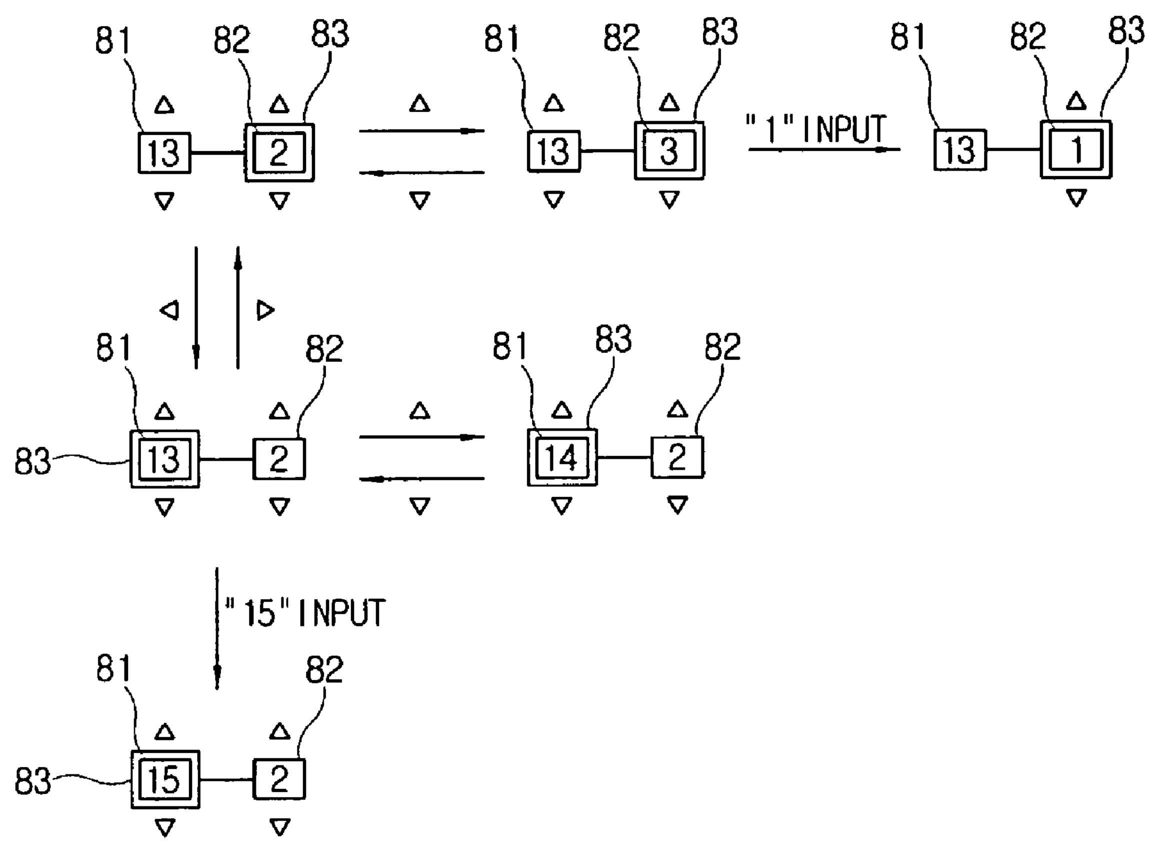
FIG. 4 is a view showing an example of display of channel numbers of the main channel and the sub channel in the course of channel selection, according to an exemplary embodiment of the present invention.

FIG. 4 is a view showing an example of displaying channel numbers of the main channel and the sub channel in the course of channel selection. First, assuming that "13" and "2" are selected as the channel number 81 of the main channel and the channel number 82 of the sub channel, respectively, and the image 83 highlighting the channel number 82 of "2" of the sub channel is displayed, when the top button 23 is pushed through the user input part 20, the channel number 82 of the sub channel increases by one to thereby be indicated as "3". Alternatively, if "1" is directly inputted through the user input part 20, the channel number 82 of the sub channel is changed to be indicated as "1".

Assuming that "13" and "2" are selected as the channel number 81 of the main channel and the channel number 82 of the sub channel, respectively, and the image 83 highlighting the channel number 82 of "2" of the sub channel is displayed, when the left button 21 is pushed through the user input part 20, the image 83 highlighting the channel number 82 of "2" of the sub channel is switched to the image 83 highlighting the channel number 81 of "13" of the main channel. At this time, if the top button 23 is pushed through the user input part 20, the channel number 81 of the main channel increases by one to thereby be indicated as "14".

On the other hand, assuming that "13" and "2" are selected as the channel number 81 of the main channel and the channel number 82 of the sub channel, respectively, and the image 83 highlighting the channel number 81 of "13" of the main channel is displayed, when "15" is directly inputted through the user input part 20, the channel number 81 of the main channel is changed to be indicated as "15".

For each of the above cases, the controller 80 controls the signal receiving part 30 and the video processing part 40 to receive, process and display a video signal corresponding to a channel number. The controller 80 in this exemplary embodiment may be implemented by a computer program to be executed by a microprocessor. In this case, the computer program may be stored in a flash memory or the like.

Figure 5:
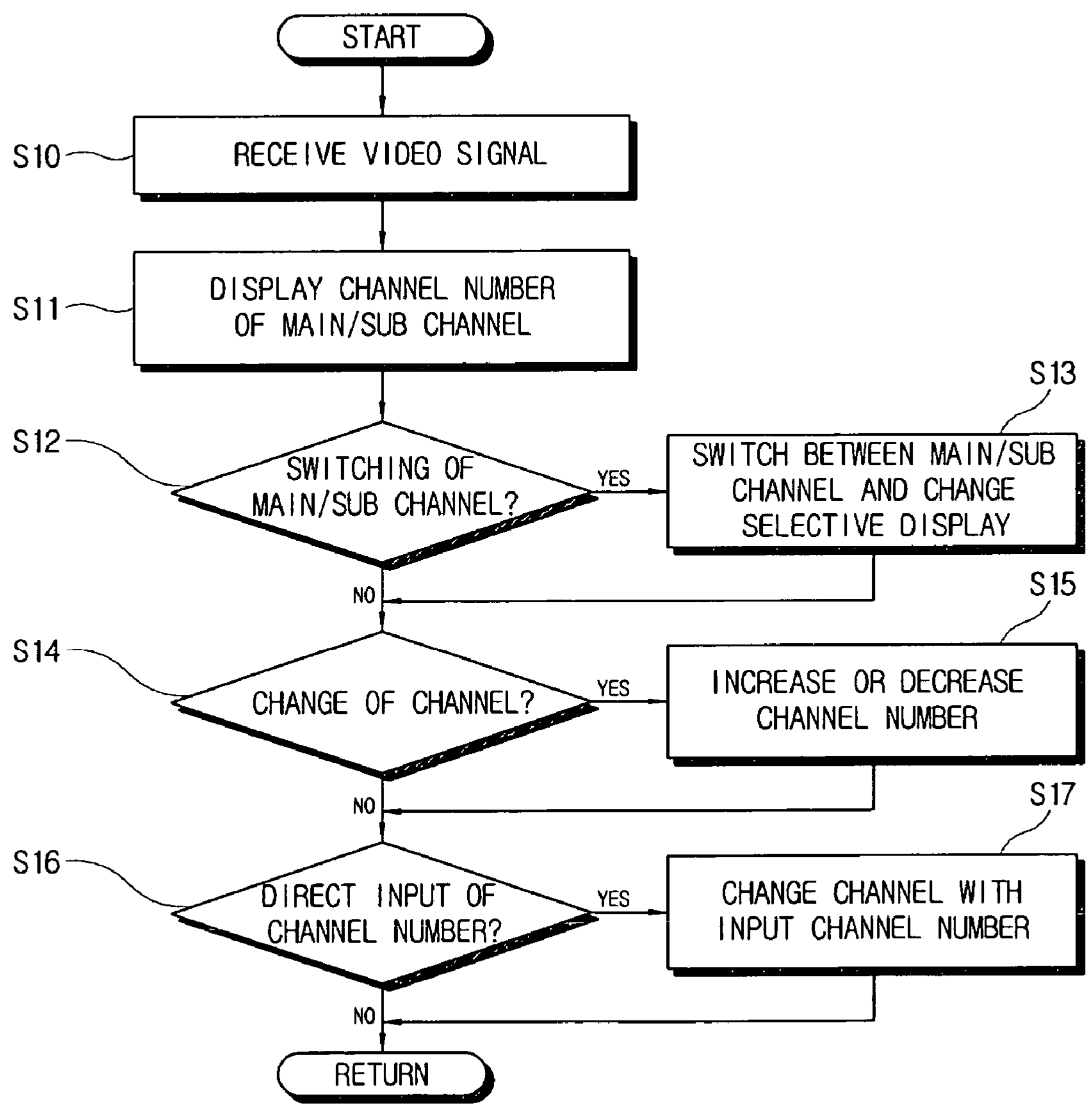
FIG. 5 is a flow chart schematically illustrating an operation of the video processing apparatus according to an exemplary embodiment of the present invention.

FIG. 5 is a flow chart schematically illustrating an operation of the video processing apparatus 10. First, the video processing apparatus 10 receives a video signal of a channel with a channel number selected by a user at operation S10. Then, the video processing apparatus 10 displays channel numbers of main and sub channels of the selected channel, and selection of the main channel or the sub channel at operation S11.

The video processing apparatus 10 confirms whether or not there is any instruction from the user to switch between the main channel and the sub channel at operation S12. If there is any instruction, the video processing apparatus 10 displays switching between the main channel and the sub channel at operation S13.

If there is no instruction to switch between the main channel and the sub channel or the switching operation is completed, the video processing apparatus 10 confirms whether or not there is any instruction from the user to change a channel number of the main channel or the sub channel at operation S14. If there is any instruction, the video processing apparatus 10 increases or decreases the channel number one by one to receive and process a video signal, and displays the increased or decreased channel number at operation S15.

If there is no instruction to change the channel number of the main channel or the sub channel or the changing operation is completed, the video processing apparatus 10 confirms whether or not there is any direct input of a channel number from the user at operation S16. If there is any direct input of a channel number, the video processing apparatus 10 receives and processes a video signal corresponding to the input channel number, and displays the input channel number at operation S17.

If there is no direct input of a channel number or operations corresponding to the direct input of the channel number are completed, the process returns to operation S10 to continue the operation of receiving video signals.

As apparent from the description, the present invention provides a video processing apparatus and a video processing method, which are capable of selecting a broadcasting channel quickly and conveniently.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents. For example, in addition to channel numbers, channel names may be used as identification information of main and sub channels. In this case, it is preferable, but not necessary, that the user input part 20 further includes character buttons for inputting channel names.

What is claimed is:

1. A video processing apparatus comprising:

a user input part which receives channel selection information from a user;

a controller which controls to display a current channel number which includes a main channel number and a sub channel number, and a selection status of one of the main channel number and the sub channel number, and to change one of the main channel number and the sub channel number, which the selection status indicates, from the current channel number corresponding to channel selection information received from the user input part.

2. The video processing apparatus according to claim 1, further comprising a signal receiving part which receives a first video signal corresponding to the current channel number, a video processing part which performs a video process on the received first video signal, wherein the controller controls the signal receiving part and the video processing part to receive and process a second video signal corresponding to the changed channel number.

3. The video processing apparatus according to claim 1, wherein the user input part comprises a pair of buttons which are operable for the selection of the one of the main channel and the sub channel.

4. The video processing apparatus according to claim 1, wherein the user input part comprises a pair of buttons to increase and decrease the channel number of the at least one of the main channel and the sub channel.

5. The video processing apparatus according to claim 1, further comprising a display which displays a video based on the processed first video signal and second video signal.

6. The video processing apparatus according to claim 1, wherein the user input part comprising a plurality of buttons corresponding to the channel numbers of the main channel and the sub channel.

7. A video processing method comprising:

displaying a current channel number which includes a main channel number and a sub channel number, and a selection status of one of the main channel number and the sub channel number;

receiving channel selection information from the user, the channel selection information being generated by a user input part; and changing one of the main channel number and the sub channel number, which the selection status indicates, from the current channel number corresponding to channel selection information received from the user input part.

8. The video processing method according to claim 7, further comprising receiving a first video signal corresponding to the current channel number, and receiving a second video signal corresponding to the changed channel number.

9. The video processing method according to claim 8, wherein only the main channel number and the sub channel number are simultaneously displayed, without additionally displaying another main channel or another sub channel.

10. The video processing method according to claim 8, wherein the channel selection information of the user indicates a change of only one from among the main channel and the sub channel, and the method according to claim 8 further comprises displaying a corresponding change of only one from among the main channel and the sub channel.

11. A video processing apparatus comprising:

a signal receiving part which receives a first video signal comprising a main channel and a sub channel;

a video processing part which performs a video process on the received first video signal;

a controller which controls the signal receiving part and the video processing part to display identification information of the main channel and identification information of the sub channel of the received first video signal and a selection status of one of the main channel and the sub channel by a user and receive and process a second video signal corresponding to channel selection information received from the user, wherein only the main channel and the sub channel are simultaneously displayed, without additionally displaying another main channel or another sub channel.

12. The video processing apparatus according to claim 1, wherein selection status indicates only one from among the channel number of the main channel and the channel number of the sub channel that is selected.

13. The video processing apparatus according to claim 1, wherein the controller receives user input to separately change only one from among the main channel number and the sub channel number, and controls to display a corresponding separately changed only one from among the main channel number and the sub channel number.

14. The video processing apparatus according to claim 1, wherein the user input part comprises a pair of buttons to increase and decrease a displayed channel number of the at least one of the main channel and the sub channel.

15. The video processing apparatus according to claim 14, wherein a pair of graphical icons corresponding to the pair of buttons, are displayed about the displayed channel number of the at least one of the main channel and the sub channel.

16. A video processing method comprising:

receiving a first video signal comprising a main channel and a sub channel;

displaying identification information of the main channel and identifying information of the sub channel of the received first video signal and a selection status of one of the main channel and the sub channel by a user;

receiving channel selection information from the user; and receiving and processing a second video signal corresponding to the channel selection information, wherein a display selection status indicates only one from among a channel number of the main channel and a channel number of the sub channel.

* * * * *